(12) United States Patent
Juliato et al.

(10) Patent No.: US 11,652,662 B2
(45) Date of Patent: May 16, 2023

(54) SPECULATIVE AND ACCELERATED CLASSIFICATION BASED ON INCOMPLETE FEATURE SETS

(71) Applicant: Intel Corporation, Santa Clara, CA (US)

(72) Inventors: Marcio Juliato, Portland, OR (US); Shabbir Ahmed, Beaverton, OR (US); Qian Wang, Portland, OR (US); Christopher Gutierrez, Hillsboro, OR (US); Vuk Lesi, Cornelius, OR (US); Manoj Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 414 days.

(21) Appl. No.: 17/025,797

(22) Filed: Sep. 18, 2020

(65) Prior Publication Data

US 2021/0006576 A1   Jan. 7, 2021

(51) Int. Cl.
*H04L 29/06* (2006.01)
*H04L 9/40* (2022.01)
*G06K 9/62* (2022.01)
*H04L 12/40* (2006.01)

(52) U.S. Cl.
CPC .......... *H04L 63/1416* (2013.01); *G06K 9/627* (2013.01); *G06K 9/6228* (2013.01); *G06K 9/6282* (2013.01); *H04L 12/40* (2013.01); *H04L 2012/40273* (2013.01)

(58) Field of Classification Search
CPC ........................... H04L 63/1416; H04L 12/40
See application file for complete search history.

(56) References Cited

U.S. PATENT DOCUMENTS

2020/0380118 A1* 12/2020 Miller .................... G06F 21/577
2021/0019399 A1*  1/2021 Miller .................... G06V 10/774

* cited by examiner

*Primary Examiner* — Jeffrey C Pwu
*Assistant Examiner* — Thong P Truong
(74) *Attorney, Agent, or Firm* — KDW Firm PLLC

(57) ABSTRACT

Systems, apparatuses, and methods to accelerate classification of malicious activity by an intrusion detection system are provided. An intrusion detection system can speculate on classification of labels in a random forest model based on temporary and incomplete set of features. Additionally, an intrusion detection system can classify malicious context based on a set of committed nodes in the random forest model.

20 Claims, 15 Drawing Sheets

SPECULATIVE AND ACCELERATED CLASSIFICATION BASED ON INCOMPLETE FEATURE SETS

BACKGROUND

Modern automobiles include a number of sensors, controllers, and processors. These devices often communicate signals and/or messages via a common bus. For example, an in-vehicle network (IVN) can be used to send messages between devices in a vehicle. Identification of the device transmitting a message is important for an overall intrusion detection system (IDS). Additionally, modern automobiles are increasingly "connected" to other devices (e.g., other automobiles, networks, communication services, entertainment services, etc.). The connectedness of modern automobiles further increases the risk of malicious attacks. An IDS may be used to reduce risk of attacks aimed to disable, overtake, reprogram, or otherwise inhibit the safe operation of the system in which the network is deployed, such as, an automobile.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In general, the present disclosure provides to accelerate classification for an intrusion detection system based on incomplete feature sets. Said differently, the present disclosure provides to classify an actor (e.g., electronic control unit, or the like) or action (a message transmitted on an IVN, or the like) as malicious or not for purposes of intrusion detection using less than all features of the classification paradigm. The present disclosure provides an IDS with low-latency (e.g., lower latency than IDS systems that rely on the entire feature set before classification, or the like) to provide for identification of malicious behavior and initiate counter measures in real-time. In particular, the present disclosure provides that compute and time efficiency is gained by not requiring the entire set of features needed to infer, or classify malicious actors or actions. This further translates to compute savings by reducing the number of features that must be extracted from collected data and samples.

In general, the present disclosure provides to accelerate classification for decision tree models by speculating on a likely classification given currently available set of features. The following descriptions are exemplified based on random forest classification. For example, as features are made available, a speculation as to the likely classification (or label) can be made based on a classification trend indicated by the extracted features. Furthermore, as features are extracted and nodes in the random forest tree are committed, labels that are unreachable may be removed from the speculative labels. In a specific example, where committed nodes indicate that benign labels are unreachable, the IDS system can speculate that the actor and activity is malicious without completing the entire feature extraction and classification.

In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

Figure 1:
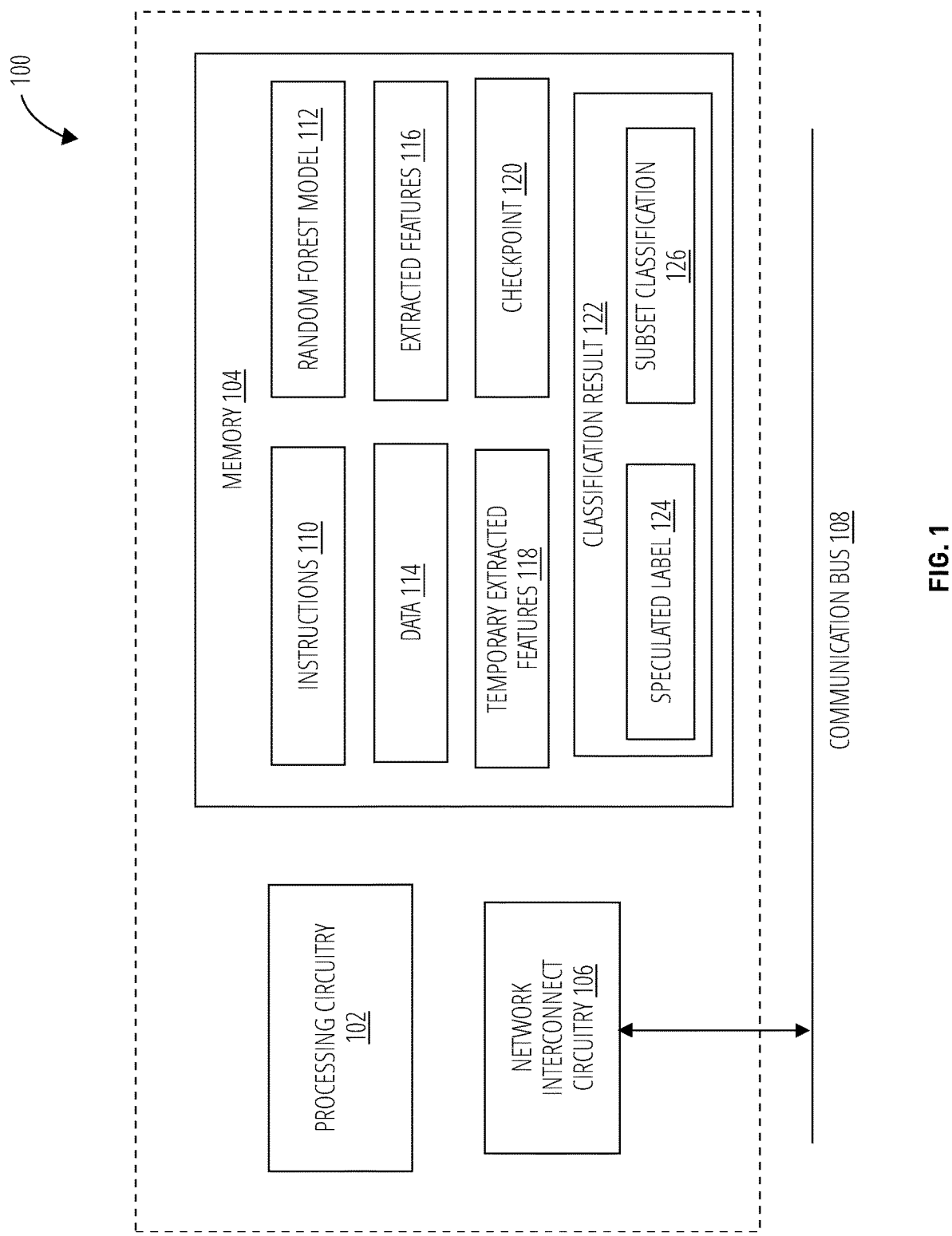
FIG. 1 illustrates an IDS device 100 for an autonomous vehicle to attest to the integrity of transported cargo.

FIG. 1 illustrates an example IDS device 100, which can be implemented to accelerate classification for an intrusion detection system (IDS). IDS device 100 can be implemented in a vehicle (e.g., car, truck, automobile, motorcycle, airplane), a train, a factory, or the like. In addition, the present disclosure could be applied to intrusion detection systems in other disciplines, such as, for example, network and/or computer security, or the like. Although the example described herein often reference automobiles, this is done for convenience in describing examples of the disclosure and not to be limiting.

IDS device 100 includes processing circuitry 102, memory 104, and network interconnect circuitry 106. Network interconnect circuitry 106 is arranged to couple IDS device 100 to a communication bus 108. Communication bus 108 can be an in-vehicle network (IVN), such as, a CAN bus, a FlexRay bus, a CAN FD bus, an automotive ethernet bus, or a local interconnected network (LIN) bus. Additionally, where implemented in contexts outside of the automotive space, the communication bus 108 can be a network bus adapted to the particular implementation, such as, for example, a communication network for manufacturing equipment, the Internet, or the like.

Memory 104 includes instructions 110 (e.g., firmware, or the like) that can be executed by processing circuitry 102. Memory 104 further includes random forest model 112, data 114, extracted features 116, temporary extracted features 118, checkpoint 120, and classification result 122. During operation, processing circuitry 102 can execute instructions 110 to identify accelerate generation of classification result 122 from random forest model 112 and extracted features 116. This is described in greater detail below. Further, an example of extracted features and classification results are provided below.

However, in general, processing circuitry 102 executes instructions 110 to identify extracted features 116 from data 114, or generate temporary extracted features 118 from data 114. In general, data 114 can be any information, such as, sensor output, messages, indications of electronic control units, network traffic, or the like. With some examples, extracted features 116 may be simply data 114. That is, random forest model 112 can operate on data 114 without modification. In other examples, extracted features 116 can be processed data 114, or can be generated from data 114. For example, if data 114 is an indication of raw traffic on communication bus 108, extracted features 116 can be an indication of the latency, bandwidth consumption, actors (e.g., electronic control units, etc.) transmitting on instructions 110, or the like.

Random forest model 112 operates on extracted features 116 to generate classification result 122. In general, random forest model 112 is a machine learning model for classification, regression, or other operations. Although the present disclosure uses random forest model 112 as an example, the concepts detailed herein to accelerate classification can be applied other such machine learning classification paradigms, such as, decision trees. As will be described in greater detail below, processing circuitry 102 can execute instructions 110 to speculate on a label with which the classification is trending based on temporary extracted features 118 to generate speculated label 124. As another example, processing circuitry 102 can execute instructions 110 to identify confirmed nodes in random forest model 112 from extracted features 116 to generate subset classification 126.

Processing circuitry 102 can include any of a variety of processors, such as, for example, commercial central processing units, application specific integrated circuits, or the like. Processing circuitry 102 can be a microprocessor or a commercial processor and can include one or multiple processing core(s) and can also include cache.

Memory 104 can be based on any of a wide variety of information storage technologies. For example, memory 104 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). Additionally, memory 104 can include storage devices.

Network interconnect circuitry 106 can include any circuitry arranged to send and/or receive information elements (e.g., data, messages, etc.) via a network, such as, instructions 110.

Figure 2:
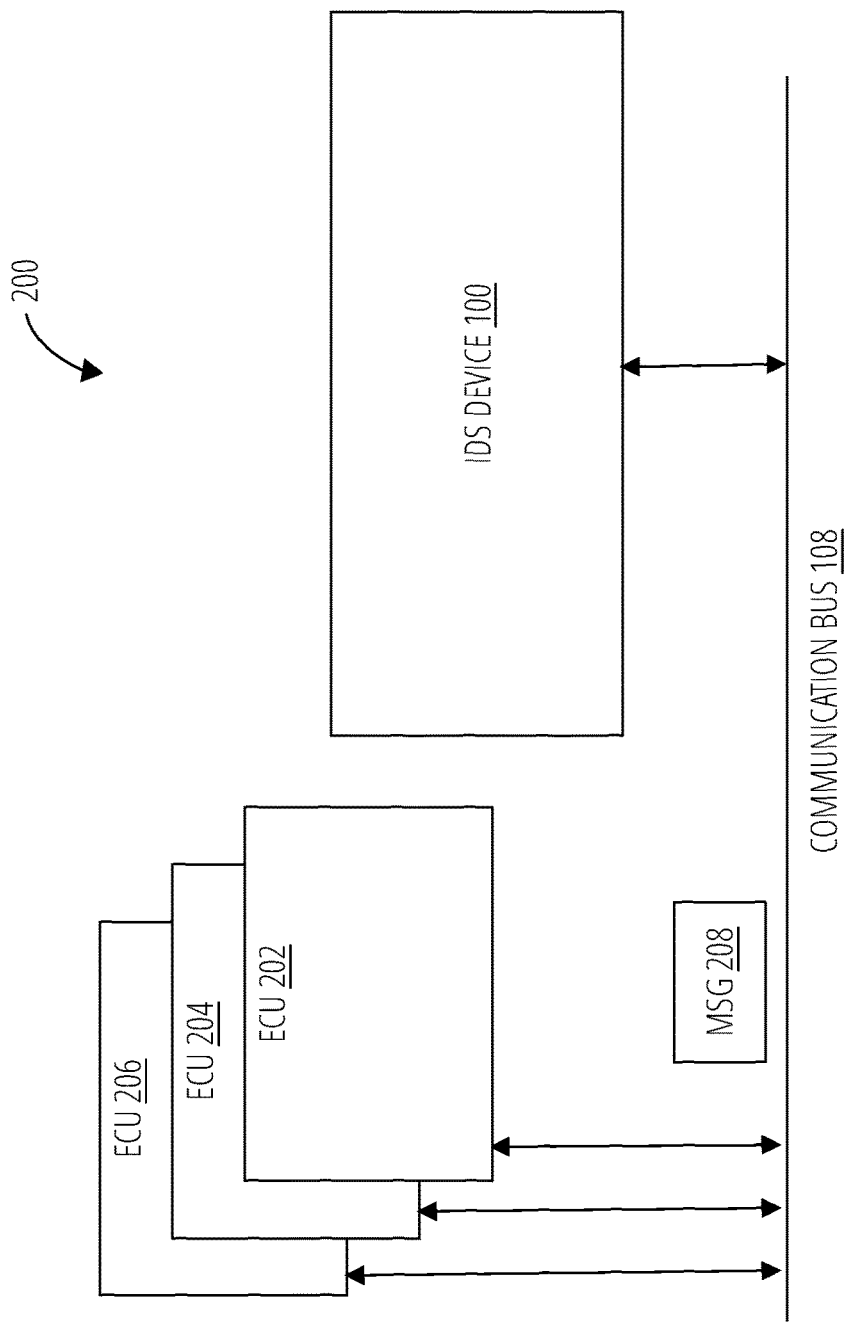
FIG. 2 illustrates a system 200 for an autonomous vehicle to attest to the integrity of transported cargo.

FIG. 2 illustrates an example system 200, which can be implemented to accelerate classification, such as, for example, for an intrusion detection system (IDS). In particular, system 200 includes IDS device 100 coupled to communication bus 108. System 200 could be implemented in a vehicle, an airplane, a train, a factory, a data center, or other such system as might utilize an IDS.

System 200 includes a number of electronic control units (ECUs), for example, ECU 202, ECU 204, and ECU 206. In general, each of ECU 202, ECU 204, and ECU 206 include circuitry arranged to generate and transmit messages onto communication bus 108 and/or receive and consume messages from communication bus 108. For example, message 208 is depicted on communication bus 108. ECUs (e.g., ECU 202, ECU 204, and ECU 206) can be any of a variety of devices, such as, for example, sensor devices, actuator devices, microprocessor control devices, or the like.

IDS device 100 can be arranged to identify (e.g., classify) actors (e.g., ECUs, or the like) and/or actions (e.g., messages, traffic on communication bus 108, or the like) as malicious or benign.

Figure 3:
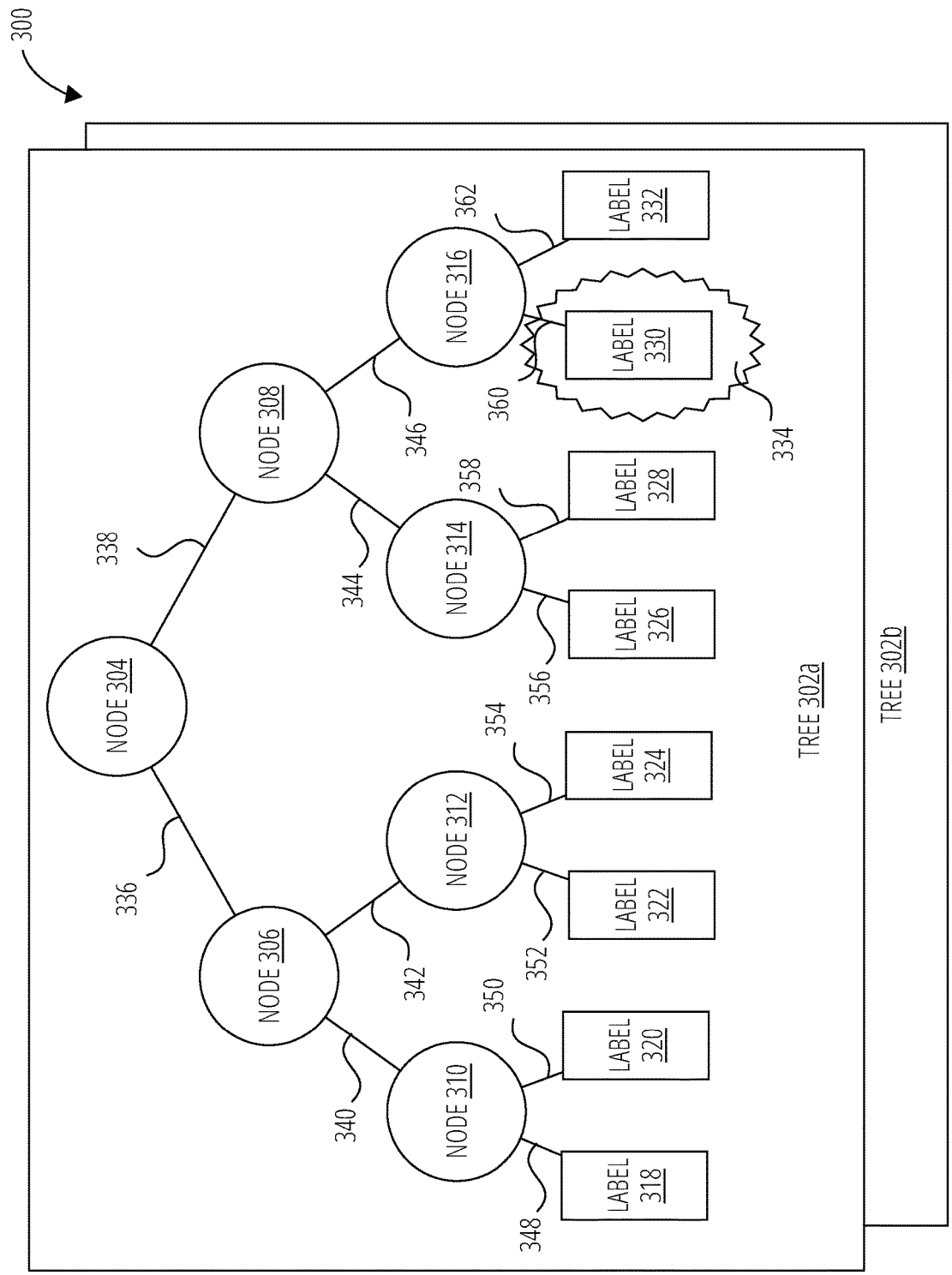
FIG. 3 illustrates a random forest model 300 including a number of trees.

For example, FIG. 3 depicts an example random forest model 300, which can be random forest model 112 of FIG. 1 described above. Random forest model 300 includes a number of trees, such as, tree 302a and tree 302b. In practice, a random forest model will have numerous trees, often more than two as depicted in FIG. 3 with respect to random forest model 300. Each tree of random forest model 300 includes a number of nodes coupled like branches of a tree and terminating at labels. For example, random forest model 300, and particularly tree 302a, is depicted including node 304, node 306, node 308, node 310, node 312, node 314, and node 316. Furthermore, random forest model 300 is depicted including label 318, label 320, label 322, label 324, label 326, label 328, label 330, and label 332. The nodes (e.g., node 304, etc.) and labels (e.g., label 318, etc.) are coupled via branches, such as, branch 336, branch 338, branch 340, branch 342, branch 344, branch 346, branch 348, branch 350, branch 352, branch 354, branch 356, branch 358, branch 360, and branch 362.

During operation, each tree outputs an indication of one of the labels and the output from all the trees (e.g., tree 302a, tree 302b, etc.) is used to vote on the output label (or classification) of the random forest model 300. As described herein, random forest model 300 can be used to classify extracted features 116 using labels (e.g., label 318, etc.) to identify malicious actors or activity. Said differently, random forest model 300 can classify actors or activity as either malicious or benign based on labels (e.g., label 318, etc.). For example, label 330 can be benign label 334 and indicate the actor or action associated with the extracted features 116 are benign while the other labels (e.g., label 318, label 320, label 322, label 324, label 326, label 328, and label 332) can be malicious labels (not numbered in this figure) to indicate the actor or action associated with extracted features 116 is malicious.

As introduced above, the present disclosure can be applied to speculate on a classification result (e.g., classification result 122, or the like) of a random forest model (e.g., random forest model 112, random forest model 300, or the like). For example, FIG. 4A, FIG. 4B, FIG. 4C, and FIG. 4D illustrate examples of speculating a classification result 122 using paths within a tree of random forest model 300. Said differently, these figures illustrate various trends towards a label or labels in a tree of random forest model 300 based on temporary extracted features. These temporary features can be used to "speculate" on the ultimate classification result 122, or rather, to generate speculated label 124. It is to be appreciate, that as a single label is benign, such as, benign label 334, then all other labels (e.g., label 318, etc.) are interpreted or inferred to be malicious. It is noted, the example depicted in FIG. 4A, FIG. 4B, FIG. 4C, and FIG. 4D, particularly with respect to benign label 334 is an example of a binary case, or rather, where one of the labels is benign while the other labels are malicious. In some examples, one of the labels could be malicious while the other labels are benign. In other examples, multiple labels could be benign and multiple labels could be malicious. Examples are not limited in this context.

Figure 4A:
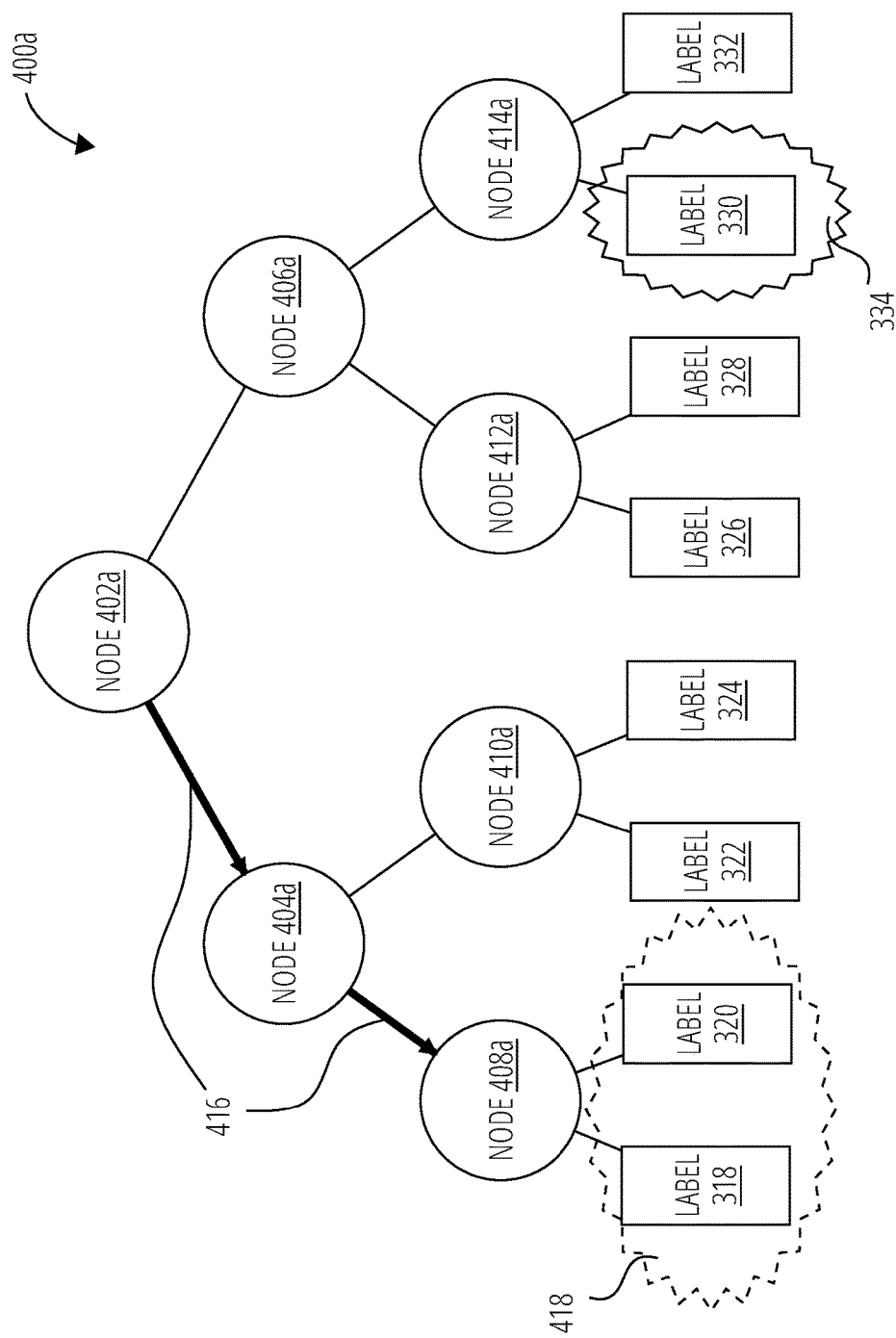
FIG. 4A illustrates a trend through a tree of a random forest model.

For example, FIG. 4A illustrates a trend to label 318 and label 320 through nodes of tree 400a based on temporary extracted features 118. As used herein, temporary extracted features 118 are ones whose final result depends on the entire sample set. Said differently, temporary features are derived based on a partial set of samples, or less than all the samples needed for a final result. For example, a mean feature needs the entire sample set to yield the final mean value. The current (temporary) mean can be used to speculate on a label based on the other nodes that have committed and the others that are still temporary. Depending on the feature, a temporary value can enable a node to commit. For instance, minimum and maximum features are monotonic, which allow for a node to make a decision if such a feature is above, equal, below, or the like a certain value. The reason being is that once the maximum or minimum value reaches a certain level, it will not reduce or increase to previous values. This monotonic behavior allows for nodes to commit to decisions even when the entire sample set has not been through the complete computation of maximum or minimums.

Final features are those where all samples required for committing a node have been acquired and the feature computation has finished while temporary features are those derived based on a partial set of samples at a moment in time. This can be referred to as "speculating" on a commitment. Furthermore, the features themselves may have a number of classes. For example, features can be monotonic or nonmonotonic. Monotonic features are those that only increase (or decrease) and do not decrease (or increase) with new samples. Examples of monotonic features are maximum, minimum, or the like. Nonmonotonic features are those features that can both increase and decrease with new samples. Examples of nonmonotonic features are mean, standard deviation, skewness, kurtosis, top, bottom, or the like.

Accordingly, FIG. 4A, FIG. 4B, FIG. 4C, FIG. 4D illustrates tree 400a, tree 400b, tree 400c, and tree 400d, respectively, of random forest model 300. Each tree is used to speculate on a label, or provide a temporary label based on partial samples as described above. It is noted, that tree a final classification to a label by a tree is there the nodes of the tree have enough information (e.g., samples, or the like) to determine a final label. Where, a speculative classification is where the nodes do not have enough information (e.g., samples, or the like) to determine a final result and the result could change based on additional information. It is further noted that final and speculative results can be referenced with respect to nodes, trees, and forests. It is to be appreciated that the result discussed will be apparent from the context. Speculative results from trees (e.g., as illustrated in FIG. 4A, FIG. 4B, FIG. 4C, and FIG. 4D, or the like) can be combined to a forest to produce a final speculative classification.

Furthermore, it is to be appreciated that trees within a random forest may not have all labels of the random forest. For example, a tree may have a subset of the labels of the random forest while another tree has a different subset. Additionally, the trees within a random forest may have different topologies one from another. However, the trees used herein share the same topology and reference the same labels for purposes of clarity of explanation and not to be limiting. In practice, the trees may have many more nodes and labels than depicted, may include subsets of the labels, may have different topologies, or the like.

Based on the trend indicated in FIG. 4A, tree 400a might classify the extracted features 116 to either label 318 or label 320 based on trend 416. Accordingly, processing circuitry 102 can execute instructions 110 to speculate, based on trend 416, that the classification result 122 will be either label 318 or label 320. In particular, trend 416 indicates that node 402a and node 404a of tree 400a have committed or are speculating on a decision while the other nodes (e.g., node 406a, node 408a, node 410a, node 412a, and node 414a) are uncommitted. As such, speculated label 418 (including label 318 or label 320) is a possible classification of tree 400a based on trend 416.

Figure 4B:
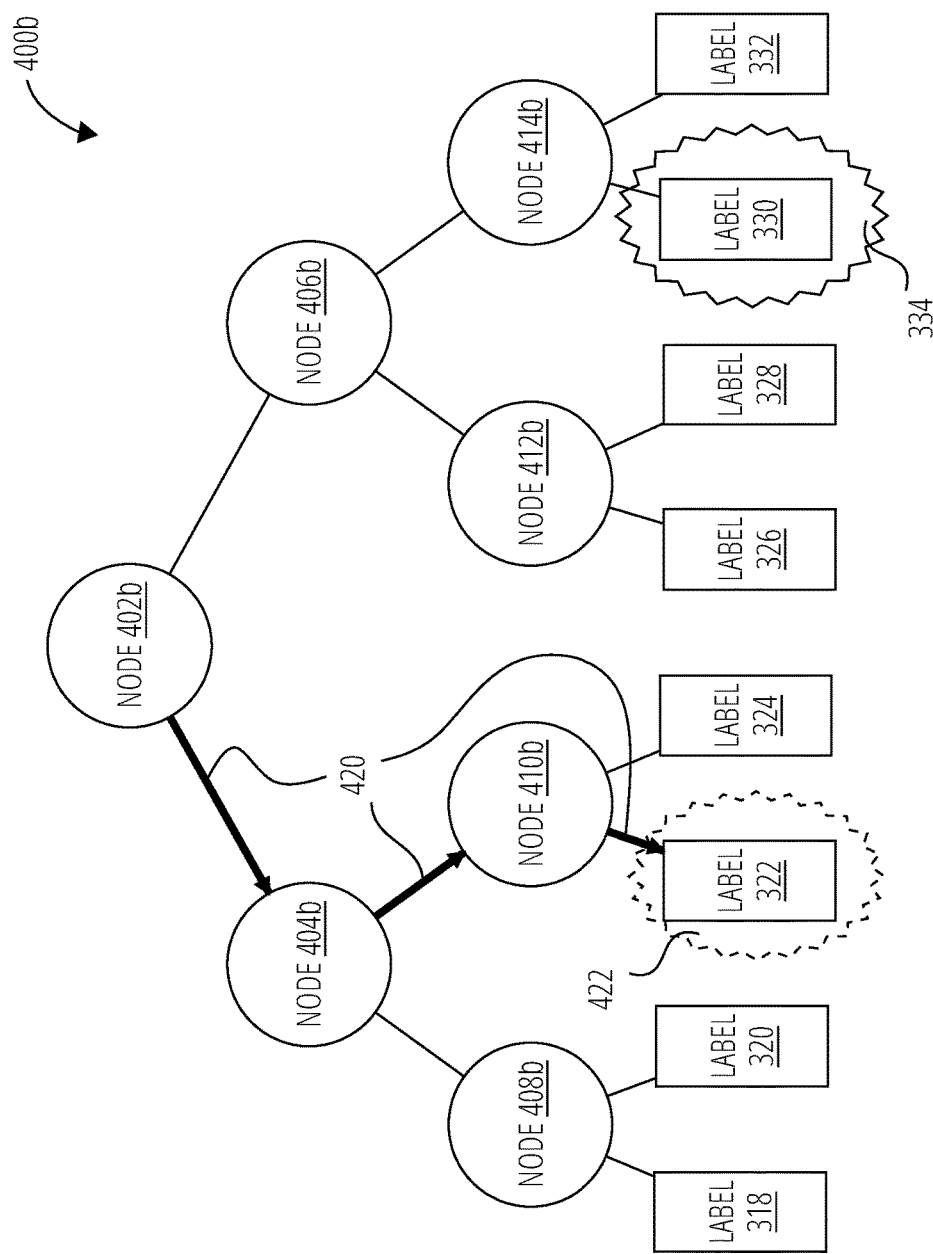
FIG. 4B illustrates a trend through a tree of a random forest model.

FIG. 4B illustrates a trend 420 to label 322 through tree 400b. In particular, this figure illustrates trend 420 through node 402b, node 404b, and node 410b of tree 400b based on temporary extracted features 118. Based on the trend 420 indicated in FIG. 4B, tree 400b might classify the extracted features 116 to label 322. Accordingly, processing circuitry 102 can execute instructions 110 to speculate, based on trend 420, that the classification result 122 will be label 322. In particular, trend 420 indicates that node 402b, node 404b, and node 410b of tree 400b have committed or are speculating on a decision while the other nodes (e.g., node 406b, node 408b, node 412b, and node 414b) are uncommitted. As such, speculated label 422 (including label 322) is a possible classification by tree 400b based on trend 420.

Figure 4C:
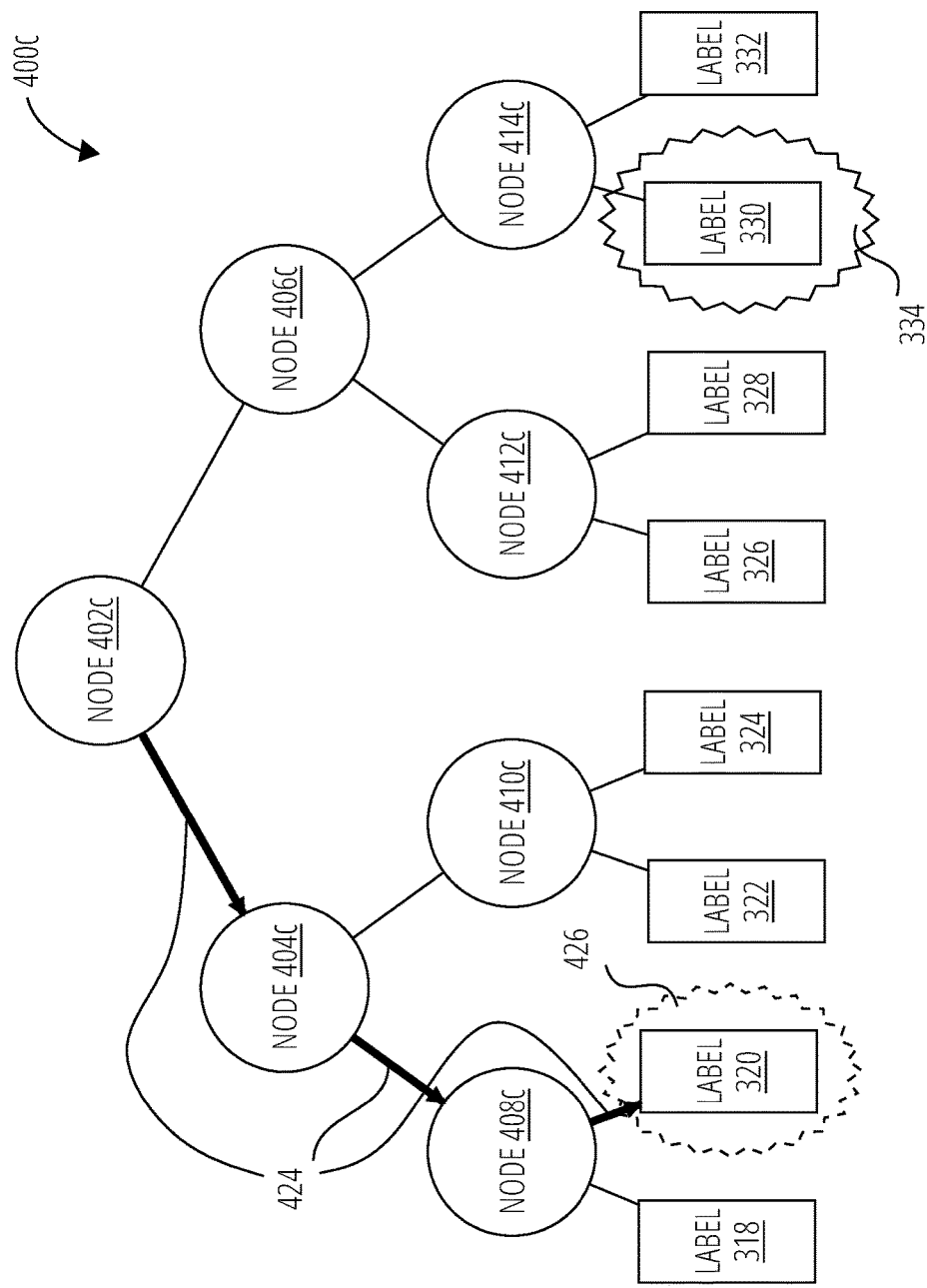
FIG. 4C illustrates a trend through a tree of a random forest model.

FIG. 4C illustrates a trend 424 to label 320 through tree 400c. In particular, this figure illustrates trend 424 through node 402c, node 040c, and node 408c of tree 400c based on temporary extracted features 118. Based on the trend 424 indicated in FIG. 4C, tree 400c might classify the extracted features 116 to label 320. Accordingly, processing circuitry 102 can execute instructions 110 to speculate, based on trend 424, that the classification result 122 will be label 320. In particular, trend 424 indicates that node 402c, node 404c, and node 408c of tree 400c have committed or are speculating on a decision while the other nodes (e.g., node 406c, node 410c, node 412c, and node 414c) are uncommitted. As such, speculated label 426 (including label 320) is a possible classification by tree 400c based on trend 424.

Figure 4D:
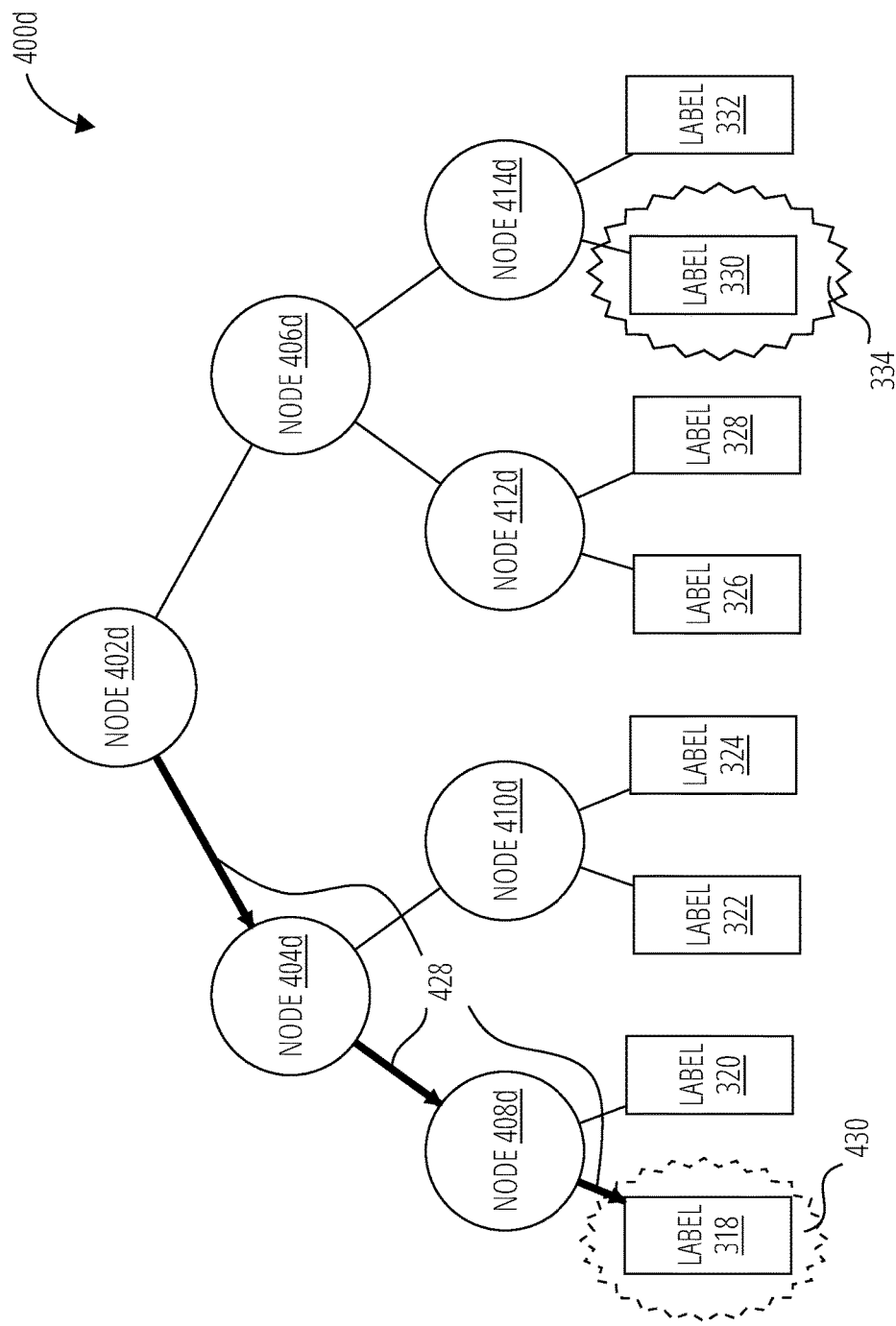
FIG. 4D illustrates a trend through a tree of a random forest model.

FIG. 4D illustrates a trend 428 to label 318 through tree 400d. In particular, this figure illustrates trend 428 through node 402d, node 404d, and node 408d of tree 400d based on temporary extracted features 118. Based on the trend 428 indicated in FIG. 4D, tree 400d might classify the extracted features 116 to label 318 based on trend 428. Accordingly, processing circuitry 102 can execute instructions 110 to speculate, based on trend 428, that the classification result 122 will be label 318. In particular, trend 428 indicates that node 402d, node 404d, and node 408d of tree 400c have committed or are speculating on a decision while the other nodes (e.g., node 406d, node 410d, node 412d, and node 414d) are uncommitted. As such, speculated label 430 (including label 318) is a possible classification by tree 400d based on trend 428.

Accordingly, temporary extracted features 118 can be used to speculate on a number of possible labels with which trees (e.g., tree 400a, tree 400b, tree 400c, and tree 400d, etc.) of random forest model 300 can classify extracted features 116. Using the examples from FIG. 4A to FIG. 4D, random forest model 300 might classify extracted features 116 as either label 318, label 320 or label 322 with label 320 being the label in the majority of the trends. As none of the labels, and particularly the majority label (e.g., label 318) are the benign label 334, it can be inferred that the actor or action with which processing circuitry 102 is executing instructions 110 to speculate on is malicious.

Figure 5:
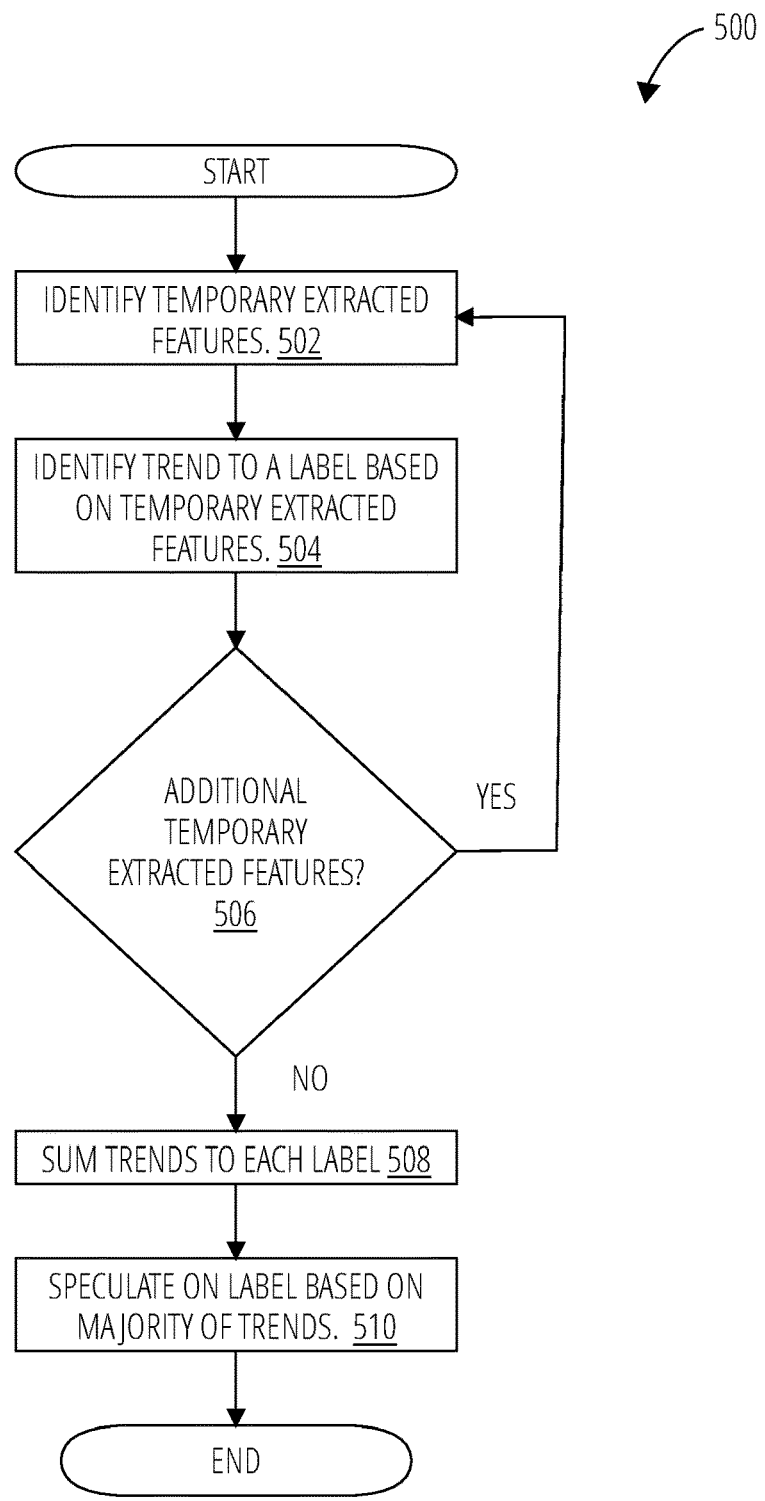
FIG. 5 illustrates a logic flow 500 to speculate on the classification of a random forest model.

FIG. 5 depict logic flow 500. Logic flow 500 can be implemented by an intrusion detection system (IDS). As a specific example, IDS device 100 (and particularly processing circuitry 102 in executing instructions 110) can implement logic flow 500 to accelerate classification for an IDS. The logic flows described herein, including logic flow 500, as well as other logic flows described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Turning more specifically to FIG. 5 and logic flow 500, it is noted that logic flow 500 could be considered a sub-flow within a larger overall logic flow to classify a final result from trees of a random forest model. In particular, logic flow 500 illustrates operations to speculate on a result using a random forest model. However, logic flow 500 can be iteratively repeated, for example, until enough nodes have committed within all the trees, such that the combined trees forms a majority leading to a final result. Once enough nodes in all the trees have committed, derivation of temporary features for other trees with uncommitted nodes can be aborted. In particular, all temporary features still being computed can be discarded and logic flow 500 could be repeated (e.g., to classify a new result) with a new sample set. As such, logic flow 500 can be implemented to speed up classification as well as speculate on the classification result while deriving the final classification.

Logic flow 500 may begin at block 502. At block 502 "identify temporary extracted features" processing circuitry can identify temporary extracted features. For example, processing circuitry 102 of IDS device 100, in executing instructions 110, can identify temporary extracted features 118 (e.g., from data 114, or the like).

Continuing to block 504 "identify a trend to a label based on temporary extracted features" processing circuitry can identify a trend to a label based on temporary extracted features. For example, processing circuitry 102 can execute instructions 110 to identify a trend to a label (e.g., trend 416, trend 420, trend 424, trend 424, and trend 428) based on temporary extracted features 118.

Continuing to decision block 506 "additional temporary extracted features?" a determination whether additional temporary extracted features exist. For example, processing circuitry 102 can execute instructions 110 to determine whether additional temporary extracted features 118 exist. From decision block 506, logic flow 500 can return to block 502 or continue to block 508. In particular, logic flow 500 can return to block 502 from decision block 506 based on a determination that additional temporary extracted features do exist while logic flow 500 can continue from decision block 506 to block 508 based on a determination that that additional temporary extracted features do not exist.

At block 508 "sum trends to each label" the trends to each label can be summed. For example, processing circuitry 102 can execute instructions 110 to sum the trends to each label. As a specific example, processing circuitry 102 can execute instructions 110 to sum trends to label 318 (e.g., trend 416 and trend 428). Additionally, processing circuitry 102 can execute instructions 110 to sum trends to 318 (e.g., trend 416 and trend 424).

Continuing to block 510 "speculate on label based on majority of trends" processing circuitry can speculate on a label based on the label with the majority of trends. For example, processing circuitry 102 in executing instructions 110 can identify the label (e.g., label 320) with the majority of trends. That is, using the examples depicted in FIG. 4A to FIG. 4D, label 318 has 2 trends (e.g., trend 416 and trend 424) while the other labels have less. As such, processing circuitry 102 in executing instructions 110 can speculate that random forest model 300 will generate classification result 122 from extracted features 116 comprising an indication of label 320. More specifically, processing circuitry 102 can execute instructions 110 to identify speculated label 124.

With some examples, logic flow 500 could include a decision block (not shown) to determine whether the speculated label is malicious or benign. Based on such a determination, logic flow 500 could include a block (not shown) to generate a checkpoint. For example, processing circuitry 102 could execute instructions 110 to determine whether label indicated in speculated label 124 is malicious or benign and generate checkpoint 120 based on a determination that the label indicated by speculated label 124 is malicious.

In some examples, processing circuitry 102 can execute instructions 110 to generate checkpoint 120 where speculated label 124 indicates malicious actors or actions in order to provide reduced time to recover where the classification result 122 actually indicates malicious actor or actions. As such, the present disclosure provides to shorten the time between when IDS classification actually finishes and recovery takes place.

Figure 6A:
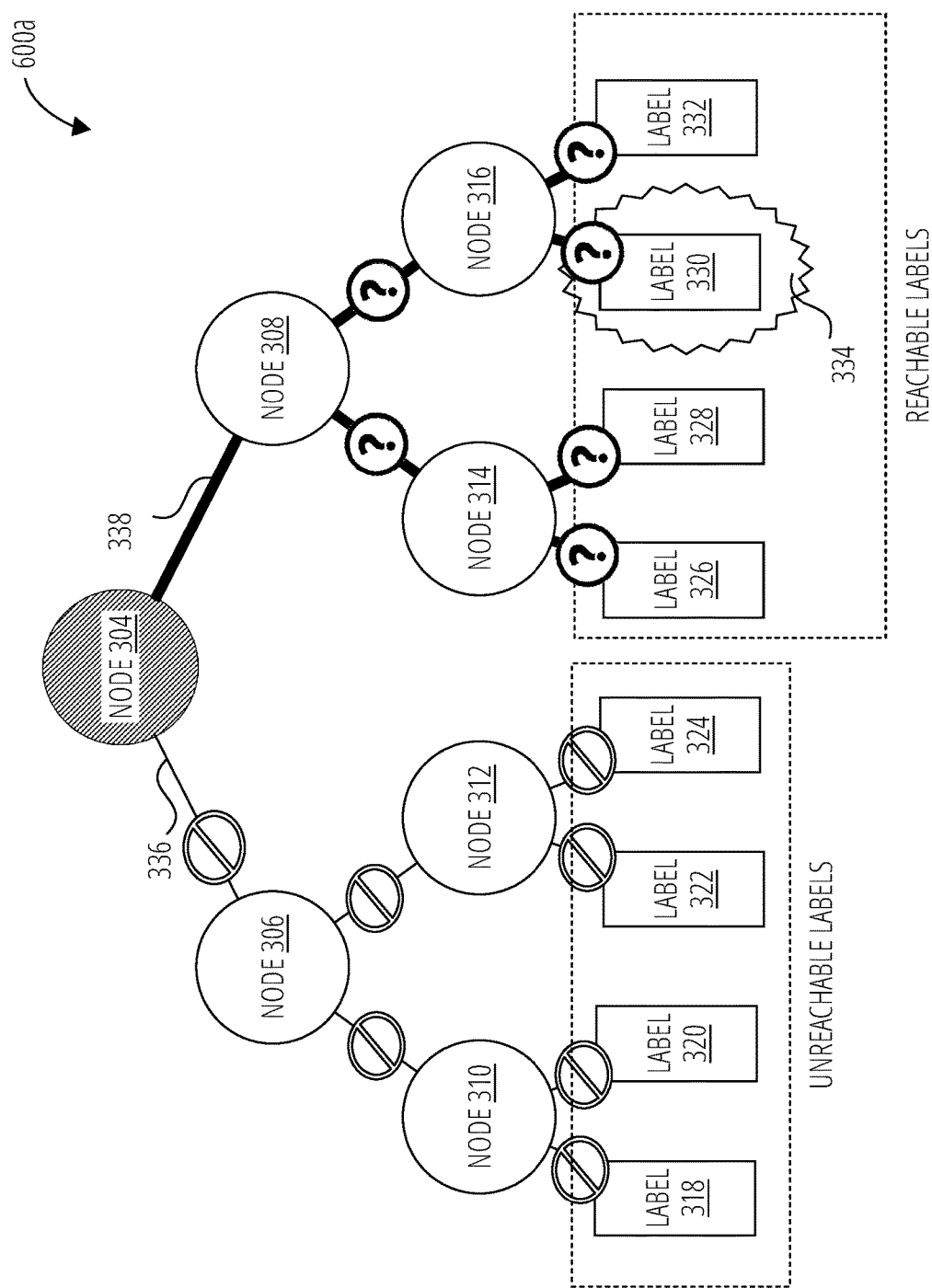
FIG. 6A illustrates a committed node in a tree of a random forest model.
Figure 6B:
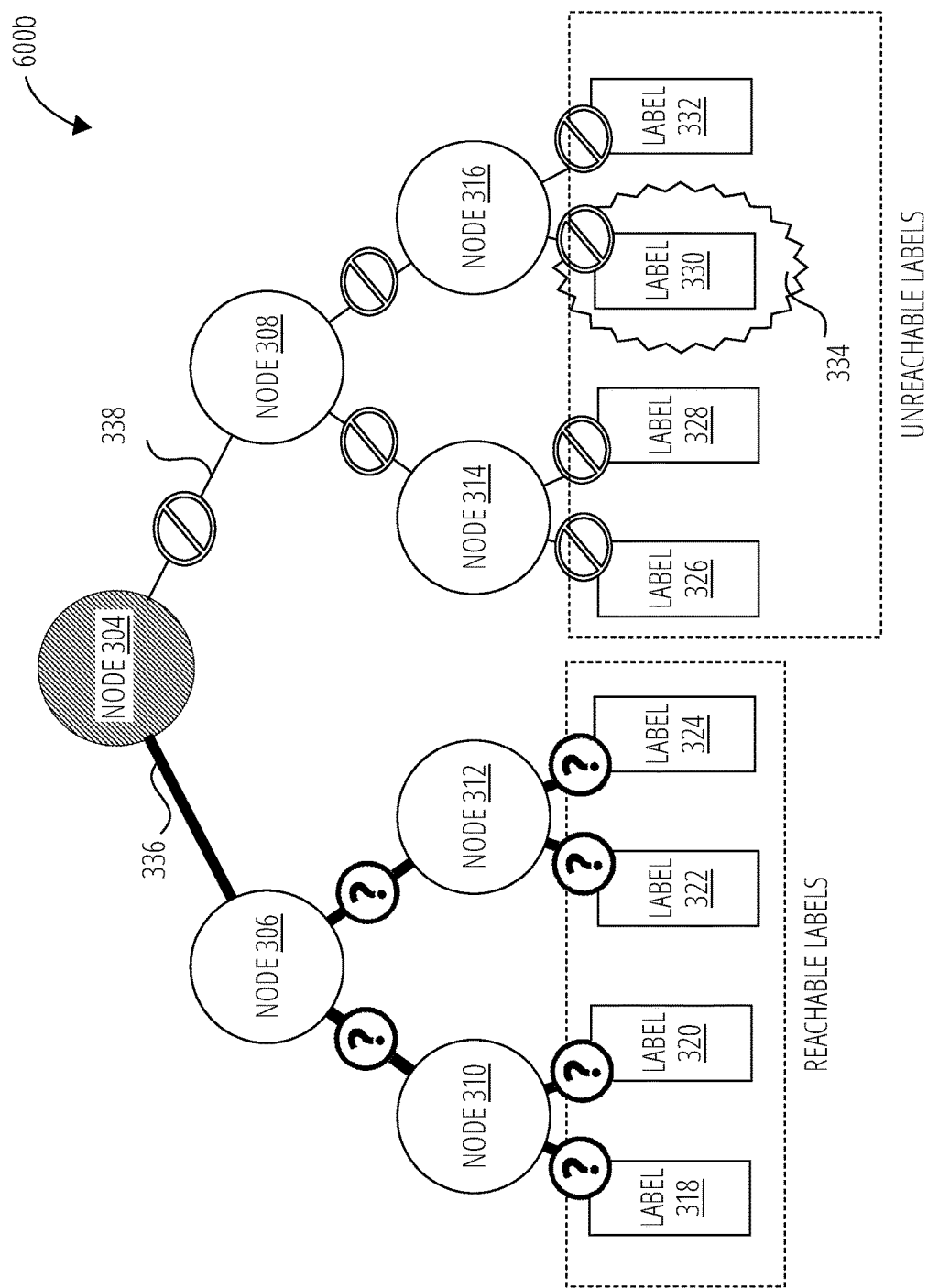
FIG. 6B illustrates a committed node in a tree of a random forest model.
Figure 6C:
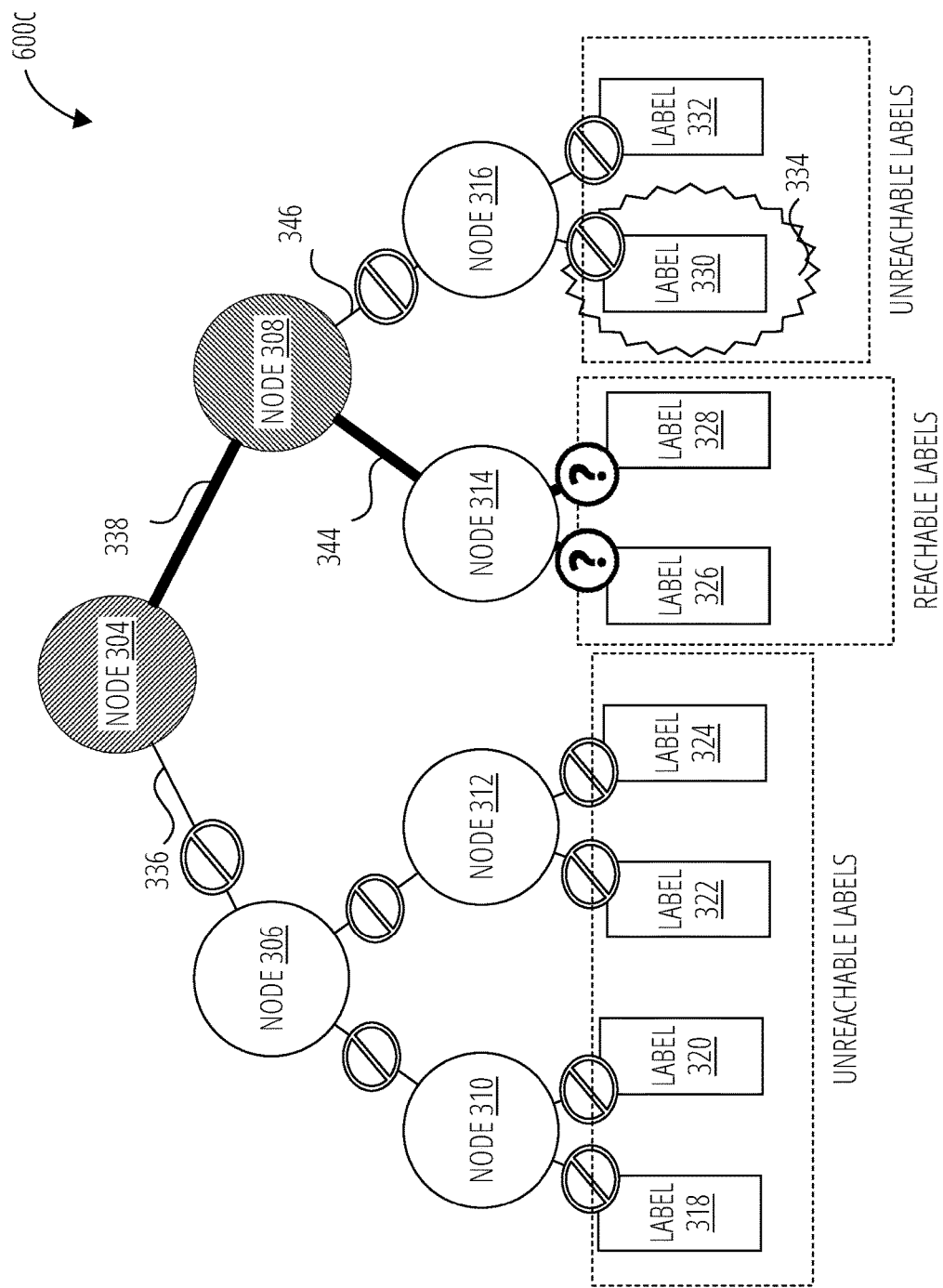
FIG. 6C illustrates a committed node in a tree of a random forest model.

As introduced above, the present disclosure can be applied to classify based on a sub-set of the features. Said differently, the present disclosure can be applied to generate classification result 122 based on part (or less than all) of extracted features 116. For example, FIG. 6A, FIG. 6B, and FIG. 6C illustrate examples of identifying a classification result 122 using a random forest model (e.g., random forest model 112, random forest model 300, or the like) from less than all of the extracted features 116. As noted above, as a single label is benign, such as, benign label 334, then all other labels (e.g., label 318, etc.) are interpreted or inferred to be malicious. As such, where committed nodes (e.g., based on portions of extracted features 116, indicate that the benign label 334 is unreachable, then it is inferred that the actor or action is malicious, even without identifying the ultimate label.

For example, FIG. 6A illustrates a tree 600a of a random forest model 300, with node 304 depicted as committed (indicated by cross hatch shading) to the right, while the other nodes are depicted as uncommitted. More particularly, FIG. 6A depicts node 304 committed to branch 338. As such, branch 336 and all labels downstream from the uncommitted branch, branch 336, such as, label 318 to label 324 are unreachable. Likewise, all labels downstream from the committed branch, branch 338, such as, label 326 to label 332 are still reachable. That is, branch 336 is foreclosed if node 304 commits to the right branch, or branch 338. As such, the benign label 334 is still reachable. The present disclosure provides that processing circuitry 102 can execute instructions 110 to identify a committed node of random forest model 112 from extracted features 116. For example, processing circuitry 102, in executing instructions 110 can identify node 304 as committed.

Conversely, referring to FIG. 6B, if in tree 600b of random forest model 300, node 304 commits (indicated by cross hatch shading) to the left while the other nodes are uncommitted, then the reachable and unreachable labels shifts. More particularly, FIG. 6B depicts node 304 committed to branch 336. As such, branch 338 and all labels downstream from the uncommitted branch, branch 338, such as, label 326 to label 332 are unreachable. Likewise, all labels downstream from the committed branch, branch 336, such as, label 318 to label 324 are still reachable. That is, branch 338 is foreclosed if node 304 commits to the left branch, or branch 336. As such, the benign label 334 is not reachable. The present disclosure provides that processing circuitry 102 can execute instructions 110 to identify a committed node of random forest model 112 from extracted features 116. For example, processing circuitry 102, in executing instructions 110 can identify node 304 as committed.

Identification of whether the benign label 334 is reachable or not can be a recursive process. For example, given node 304 committed to the right as depicted in FIG. 6A, the benign label 334 is still reachable. Turning to FIG. 6C, which illustrates tree 600c of random forest model 300, with node 304 committed to the right and node 314 committed to the left with the other nodes uncommitted. As can be seen, with node 304 committed to branch 338 and node 308 committed to branch 344, only label 326 and label 328 are still reachable. As such, label 318 to label 324 as well as label 330 and label 332 are unreachable. Of note, the benign label 334 is unreachable. The present disclosure provides that processing circuitry 102 can execute instructions 110 to identify a committed node of random forest model 112 from extracted features 116. For example, processing circuitry 102, in executing instructions 110 can identify committed node (e.g., node 304, node 308, etc.). Additionally, processing circuitry 102 can execute instructions 110 to identify labels which are no longer reachable based on the identified committed nodes.

It is noted that, in practice, tree 600c could be a further iteration of tree 600a or could be an entirely different tree in random forest model 300. Furthermore, it is to be appreciated that all trees in a random forest can contribute their label to the majority voting of the random forest. In this case, some trees may be still speculating on the output label, while others may have committed (though some of their internal nodes may still be speculating). The majority voting of the random forest would take the current value of the trees' labels and output a speculative label. Once the majority of the tree labels are committed, the majority voting of the random forest would be able to commit on the final label of the random forest (though some trees may still be speculating).

Accordingly, the present disclosure provides that an IDS system can accelerate identification of malicious activity, for example, based on accelerating classification of a random forest model as described herein. As a specific example, an IDS arranged to identify masquerading of messages (e.g., message 208) by ECUs (e.g., ECU 202, etc.) could implement the present disclosure to accelerate identification of malicious or benign messages. As only one label can be benign, provided classification with partial features (e.g., as described herein with respect to FIG. 6A, FIG. 6B and FIG. 6C) indicates that the benign label is unreachable, the IDS system can avoid computing the entire classification. As such, a reduction is compute resources as well as time to identify malicious behavior can be achieved.

Figure 7:
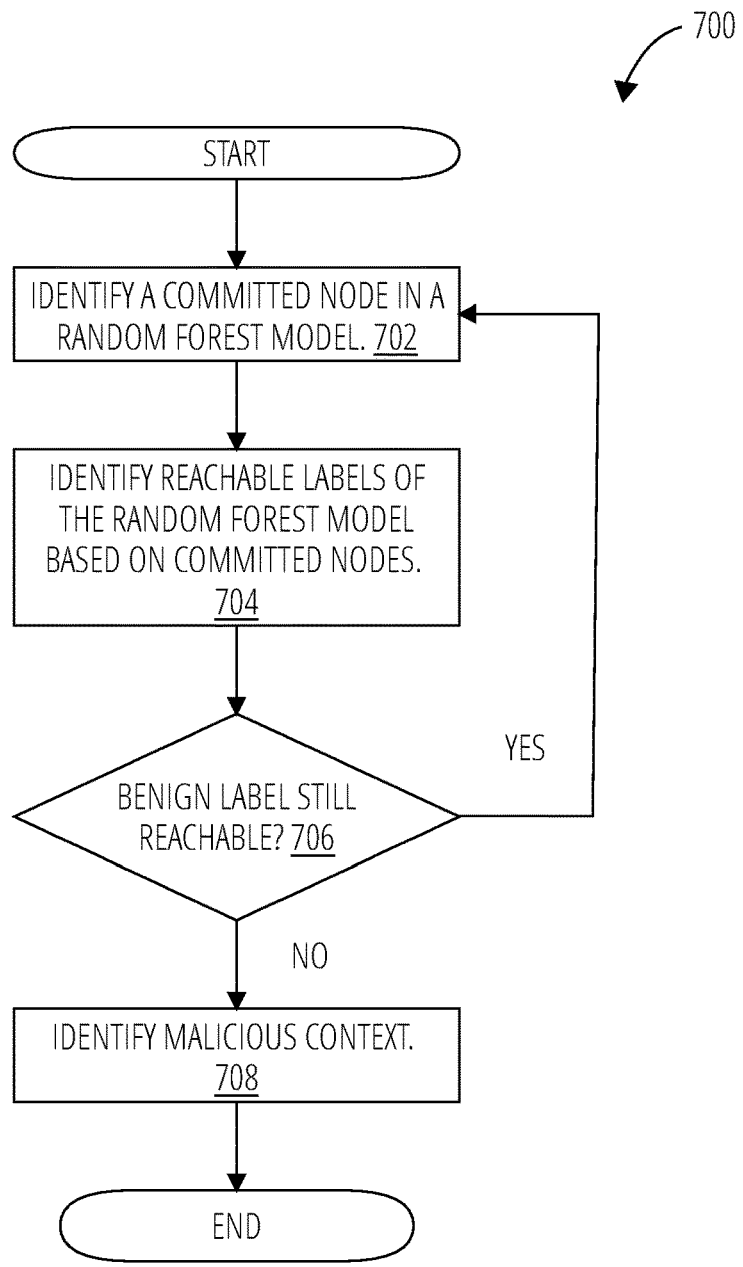
FIG. 7 illustrates a logic flow 700 to accelerate classification of a random forest model using committed nodes.

FIG. 7 depict logic flow 700. Logic flow 700 can be implemented by an intrusion detection system (IDS). As a specific example, IDS device 100 (and particularly processing circuitry 102 in executing instructions 110) can implement logic flow 700 to accelerate classification for an IDS. The logic flows described herein, including logic flow 700, as well as other logic flows described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Turning more specifically to FIG. 7 and logic flow 700, which may begin at block 702. At block 702 "identify a committed node in a random forest model" processing circuitry can identify a committed node in a random forest model. For example, processing circuitry 102 of IDS device 100, in executing instructions 110, can identify a committed node (e.g., node 304, or the like) of a random forest model (e.g., random forest model 300, or the like).

Continuing to block 704 "identify reachable labels of the random forest model based on committed nodes" processing circuitry can identify labels of the random forest model that are reachable based on committed nodes. For example, processing circuitry 102 can execute instructions 110 to identify labels (e.g., label 318, etc.) of the random forest model (e.g., random forest model 300) that are reachable based on the committed nodes.

Continuing to decision block 706 "benign label still reachable?" processing circuitry can make a determination whether the benign label is still reachable. For example, processing circuitry 102 can execute instructions 110 to determine whether the benign label (e.g., benign label 334) is still reachable given the committed nodes. From decision block 706, logic flow 700 can return to block 702 or continue to block 708. In particular, logic flow 700 can return to block 702 from decision block 706 based on a determination that the benign label is still reachable while logic flow 700 can continue from decision block 706 to block 708 based on a determination that that benign label is not reachable.

At block 708 "identify malicious context" processing circuitry can identify malicious context (e.g., a malicious actor, malicious action, or the like). For example, processing circuitry 102 can execute instructions 110 to identify the context (e.g., ECU, message, etc.) as malicious (e.g., based on the determination that the benign label is not reachable).

Figure 8:
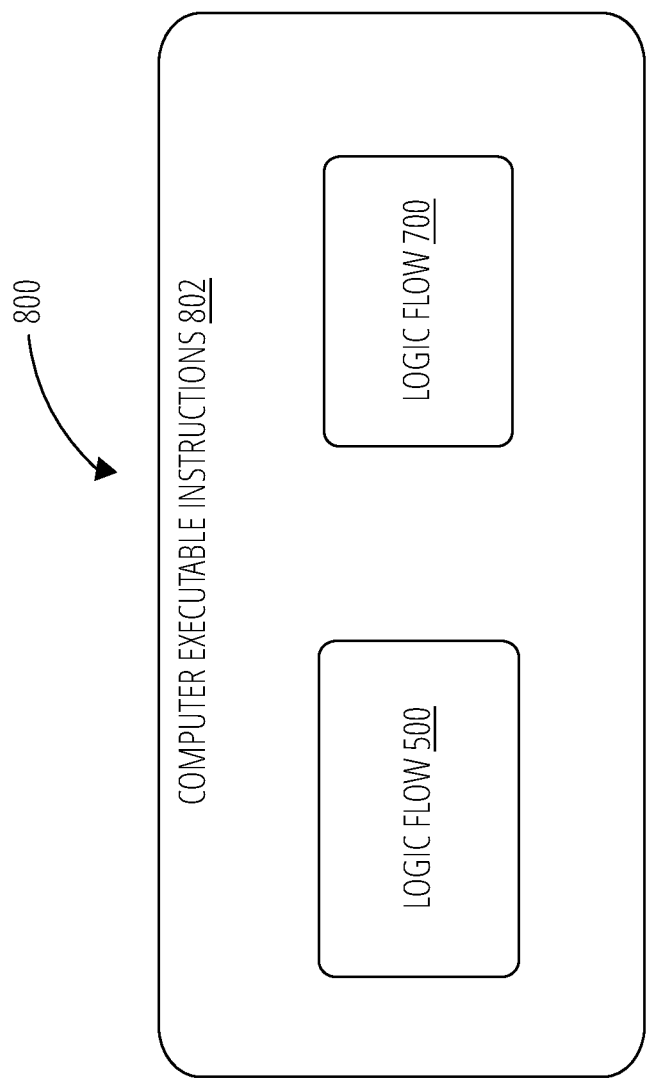
FIG. 8 illustrates a storage device 800 in accordance with one embodiment.

FIG. 8 illustrates an example of a storage device 800. Storage device 800 may comprise an article of manufacture, such as, any non-transitory computer readable medium or machine readable medium, such as an optical, magnetic or semiconductor storage. Storage device 800 may store various types of computer executable instructions 802, such as instructions to implement logic flow 500 or logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
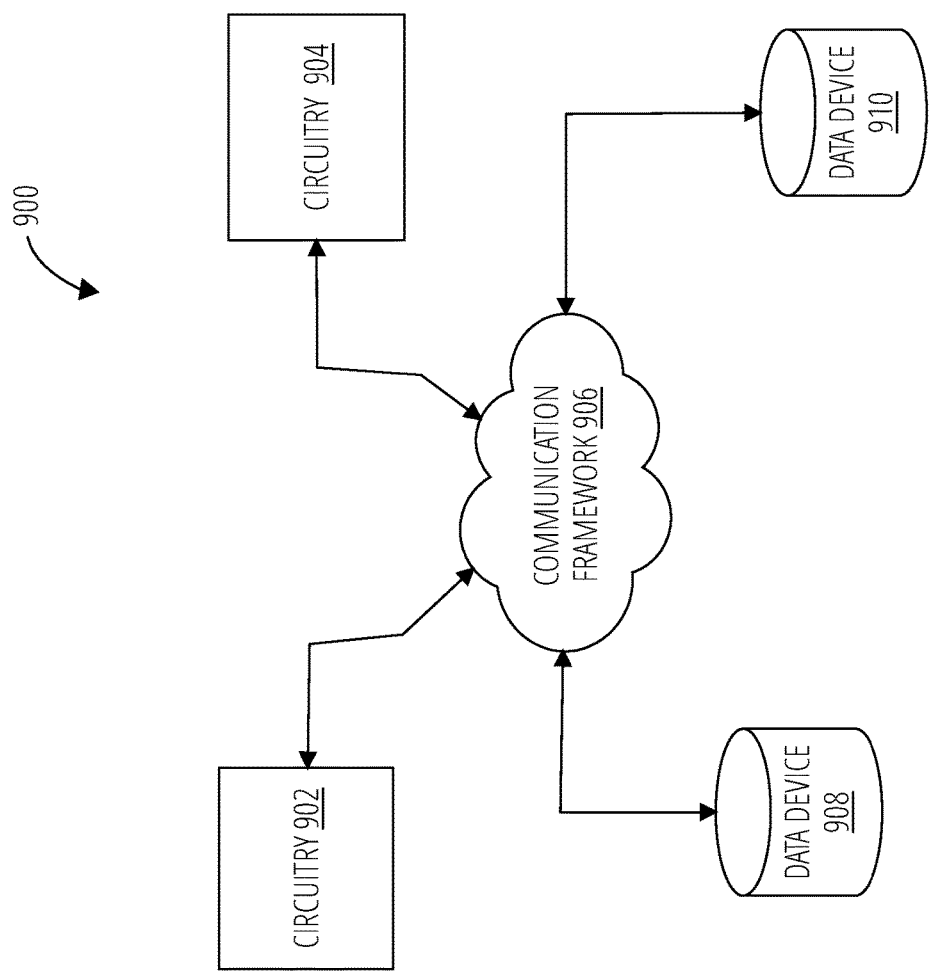
FIG. 9 illustrates an in-vehicle communication architecture 900 in accordance with one embodiment.

FIG. 9 illustrates an in-vehicle communication architecture 900 according to one or more embodiments of the disclosure. For example, one or more vehicular devices, components, or circuits, such as circuitry 902 and/or circuitry 904, may communicate with each other via a communications communication framework 906, which may be an in-vehicle network, such as a CAN bus, implemented to facilitate fingerprinting of ECUs as described above.

The in-vehicle communication architecture 900 includes various common communications elements, such as a transmitter, receiver, transceiver, and so forth. The embodiments, however, are not limited to implementation by the in-vehicle communication architecture 900. As shown in this figure, the vehicular circuitry 902 and circuitry 904 may each be operatively connected to one or more respective data devices, such as, data device 908 and/or data device 910 that can be employed to store information local to the respective circuitry 902 and/or circuitry 904, such as random forest models, extracted features, committed nodes, reachable labels, or the like. It may be understood that the circuitry 902 and circuitry 904 may be any suitable vehicular component, such as sensor, an ECU, microcontroller, microprocessor, processor, ASIC, field programmable gate array (FPGA), a neural compute circuit, an machine learning accelerator, any electronic device, computing device, or the like. Moreover, it may be understood that one or more computing devices (containing at least a processor, memory, interfaces, etc.) may be connected to the communication framework 906 in a vehicle.

Further, the communication framework 906 may implement any well-known communications techniques and protocols. As described above, the communication framework 906 may be implemented as a CAN bus protocol or any other suitable in-vehicle communication protocol. The communication framework 906 may also implement various network interfaces arranged to accept, communicate, and connect to one or more external communications networks (e.g., Internet). A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. The communication framework 906 may employ both wired and wireless connections.

Figure 10:
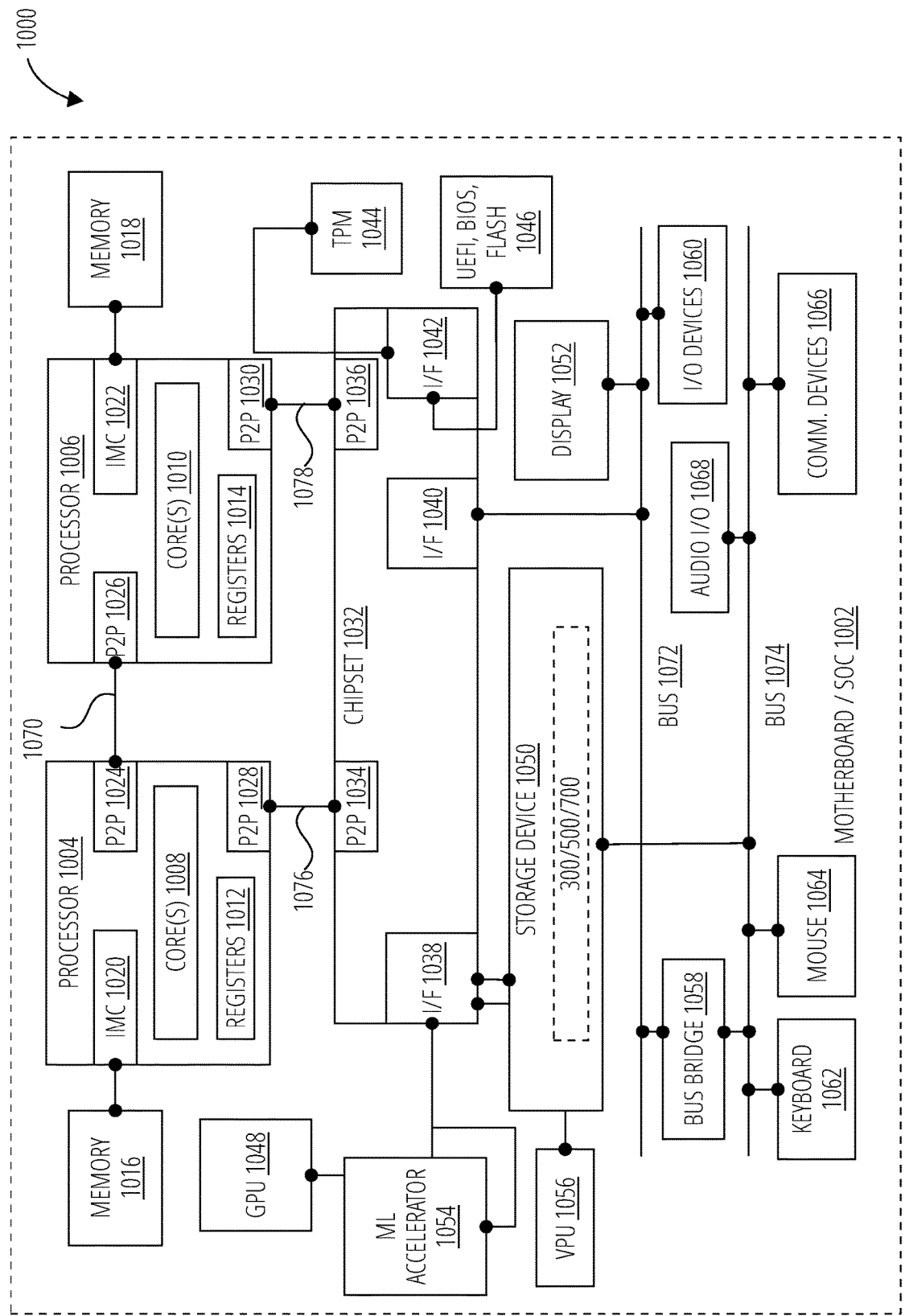
FIG. 10 illustrates an aspect of the subject matter in accordance with one embodiment.

FIG. 10 illustrates an embodiment of a system 1000. System 1000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 1000 may have a single processor with one core or more than one processor. Note that the term "processor" refers to a processor with a single core or a processor package with multiple processor cores. In at least one embodiment, the computing system 1000 is representative of the components of the IDS device 100. More generally, the computing system 1000 is configured to implement all logic, systems, logic flows, methods, apparatuses, and functionality described herein with reference to FIG. 1 through FIG. 9. In particular, system 1000 can be arranged to accelerate classification by a random forest model using the circuitry, components, and/or devices depicted and described with respect to FIG. 10.

As used in this application, the terms "system" and "component" and "module" are intended to refer to a computer-related entity, either hardware, a combination of hardware and software, software, or software in execution, examples of which are provided by the exemplary system 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 1000 comprises a motherboard or system-on-chip (SoC) 1002 for mounting platform components. Motherboard or system-on-chip (SoC) 1002 is a point-to-point (P2P) interconnect platform that includes a first processor 1004 and a second processor 1006 coupled via a point-to-point interconnect 1070 such as an Ultra Path Interconnect (UPI). In other embodiments, the system 1000 may be of another bus architecture, such as a multi-drop bus. Furthermore, each of processor 1004 and processor 1006 may be processor packages with multiple processor cores including core(s) 1008 and core(s) 1010, respectively. While the system 1000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 1004 and chipset 1032. Some platforms may include additional components and some platforms may only include sockets to mount the processors and/or the chipset. Furthermore, some platforms may not have sockets (e.g. SoC, or the like).

The processor 1004 and processor 1006 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 1004 and/or processor 1006. Additionally, the processor 1004 need not be identical to processor 1006.

Processor 1004 includes register 1012, an integrated memory controller (IMC) 1020 and point-to-point (P2P) interface 1024 and P2P interface 1028. Similarly, the processor 1006 includes register 1014, an IMC 1022 as well as P2P interface 1026 and P2P interface 1030. IMC 1020 and IMC 1022 couple the processors processor 1004 and processor 1006, respectively, to respective memories (e.g., memory 1016 and memory 1018). Memory 1016 and memory 1018 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 1016 and memory 1018 locally attach to the respective processors (i.e., processor 1004 and processor 1006). In other embodiments, the main memory may couple with the processors via a bus and shared memory hub.

System 1000 includes chipset 1032 coupled to processor 1004 and processor 1006. Furthermore, chipset 1032 can be coupled to storage device 1050, for example, via an interface (I/F) 1038. The I/F 1038 may be, for example, a Peripheral Component Interconnect-enhanced (PCI-e). Storage device 1050 can store instructions executable by circuitry of system 1000 (e.g., processor 1004, processor 1006, GPU 1048, ML accelerator 1054, vision processing unit 1056, or the like). For example, storage device 1050 can store instructions for random forest model 300, logic flow 500, logic flow 700, or the like.

Processor 1004 couples to a chipset 1032 via P2P interface 1028 and P2P 1034 while processor 1006 couples to a chipset 1032 via P2P interface 1030 and P2P 1036. Direct media interface (DMI) 1076 and DMI 1078 may couple the P2P interface 1028 and the P2P 1034 and the P2P interface 1030 and P2P 1036, respectively. DMI 1076 and DMI 1078 may be a high-speed interconnect that facilitates, e.g., eight Giga Transfers per second (GT/s) such as DMI 3.0. In other embodiments, the processor 1004 and processor 1006 may interconnect via a bus.

The chipset 1032 may comprise a controller hub such as a platform controller hub (PCH). The chipset 1032 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 1032 may comprise more than one controller hub such as a chipset with a memory controller hub, a graphics controller hub, and an input/output (I/O) controller hub.

In the depicted example, chipset 1032 couples with a trusted platform module (TPM) 1044 and UEFI, BIOS, FLASH circuitry 1046 via I/F 1042. The TPM 1044 is a dedicated microcontroller designed to secure hardware by integrating cryptographic keys into devices. The UEFI, BIOS, FLASH circuitry 1046 may provide pre-boot code.

Furthermore, chipset 1032 includes the I/F 1038 to couple chipset 1032 with a high-performance graphics engine, such as, graphics processing circuitry or a graphics processing unit (GPU) 1048. In other embodiments, the system 1000 may include a flexible display interface (FDI) (not shown) between the processor 1004 and/or the processor 1006 and the chipset 1032. The FDI interconnects a graphics processor core in one or more of processor 1004 and/or processor 1006 with the chipset 1032.

Additionally, ML accelerator 1054 and/or vision processing unit 1056 can be coupled to chipset 1032 via I/F 1038. ML accelerator 1054 can be circuitry arranged to execute ML related operations (e.g., training, inference, etc.) for ML models. Likewise, vision processing unit 1056 can be circuitry arranged to execute vision processing specific or related operations. In particular, ML accelerator 1054 and/or vision processing unit 1056 can be arranged to execute mathematical operations and/or operands useful for machine learning, neural network processing, artificial intelligence, vision processing, etc.

Various I/O devices 1060 and display 1052 couple to the bus 1072, along with a bus bridge 1058 which couples the bus 1072 to a second bus 1074 and an I/F 1040 that connects the bus 1072 with the chipset 1032. In one embodiment, the second bus 1074 may be a low pin count (LPC) bus. Various devices may couple to the second bus 1074 including, for example, a keyboard 1062, a mouse 1064 and communication devices 1066.

Furthermore, an audio I/O 1068 may couple to second bus 1074. Many of the I/O devices 1060 and communication devices 1066 may reside on the motherboard or system-on-chip (SoC) 1002 while the keyboard 1062 and the mouse 1064 may be add-on peripherals. In other embodiments, some or all the I/O devices 1060 and communication devices 1066 are add-on peripherals and do not reside on the motherboard or system-on-chip (SoC) 1002.

The components and features of the devices described above may be implemented using any combination of: processing circuitry, discrete circuitry, application specific integrated circuits (ASICs), logic gates and/or single chip architectures, etc. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected"

along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The following examples pertain to further embodiments, from which numerous permutations and configurations will be apparent.

EXAMPLE 1

A computing apparatus comprising: circuitry; and memory coupled to the circuitry, the memory storing instructions, which when executed by the circuitry cause the apparatus to: identify a first one or more temporary extracted features, the extracted features associated with inputs to a random forest model, the random forest model arranged to classify the extracted features into one of a plurality of labels; process, via the circuitry, the first one or more temporary extracted features to identify a first trend, the first trend indicating a first one or more of the plurality of labels; identify a label of the plurality of labels based on the first one or more of the plurality of labels; and generate a speculated classification result based on the label.

EXAMPLE 2

The computing apparatus of claim 1, the memory storing instructions that when executed by the circuitry further cause the apparatus to, comprising: identify a second one or more temporary extracted features; process, via the circuitry, the second one or more temporary extracted features to identify a second trend, the second trend indicating a second one or more of the plurality of labels; and identify the label of the plurality of labels based on the first one or more of the plurality of labels and the second one or more of the plurality of labels.

EXAMPLE 3

The computing apparatus of claim 1, the memory storing instructions that when executed by the circuitry further cause the apparatus to, comprising: sum, for each label of the plurality of labels, a number of times the label is included in the first one or more of the plurality of labels and the second one or more of the plurality of labels; and identify the label of the plurality of labels based on the sums.

EXAMPLE 4

The computing apparatus of claim 1, wherein a one of the plurality of labels correspond to a benign context.

EXAMPLE 5

The computing apparatus of claim 4, the memory storing instructions that when executed by the circuitry further cause the apparatus to, comprising: determine whether the label of the plurality of labels is the one of the plurality of labels corresponding to the benign context; and generate a checkpoint of a system based on a determination that the label of the plurality of labels is not the one of the plurality of labels corresponding to the benign context.

EXAMPLE 6

The computing apparatus of claim 1, comprising: an in-vehicle network (IVN); a plurality of electronic control units (ECUs) coupled via the IVN; and an intrusion detection system (IDS), the IDS comprising the circuitry and the memory.

EXAMPLE 7

A method, comprising: identifying a first one or more temporary extracted features, the extracted features associated with inputs to a random forest model, the random forest model arranged to classify the extracted features into one of a plurality of labels; processing, via circuitry, the first one or more temporary extracted features to identify a first trend, the first trend indicating a first one or more of the plurality of labels; identifying a label of the plurality of labels based on the first one or more of the plurality of labels; and generating a speculated classification result based on the label.

EXAMPLE 8

The method of claim 7, comprising: identifying a second one or more temporary extracted features; processing, via the circuitry, the second one or more temporary extracted features to identify a second trend, the second trend indicating a second one or more of the plurality of labels; and identifying the label of the plurality of labels based on the first one or more of the plurality of labels and the second one or more of the plurality of labels.

EXAMPLE 9

The method of claim 8, comprising: summing, for each label of the plurality of labels, a number of times the label is included in the first one or more of the plurality of labels and the second one or more of the plurality of labels; and identify the label of the plurality of labels based on the sums.

EXAMPLE 10

The method of claim 7, wherein a one of the plurality of labels correspond to a benign context.

EXAMPLE 11

The method of claim 10, comprising: determining whether the label of the plurality of labels is the one of the plurality of labels corresponding to the benign context; and generating a checkpoint of a system based on a determination that the label of the plurality of labels is not the one of the plurality of labels corresponding to the benign context.

EXAMPLE 12

The method of any one of claims 8 to 11, wherein the circuitry is included as part of an intrusion detection system (IDS), the IDS to be coupled to an in-vehicle network (IVN) arranged to facilitate communication of messages between a plurality of electronic control units (ECUs), the IDS arranged to identify malicious ones of the messages.

EXAMPLE 13

An apparatus, comprising means arranged to implement the function of any one of claims 8 to 12.

EXAMPLE 14

At least one non-transitory computer-readable storage medium comprising instructions that when executed by circuitry of an intrusion detection system (IDS), cause the IDS to: identify a first one or more temporary extracted features, the extracted features associated with inputs to a random forest model, the random forest model arranged to classify the extracted features into one of a plurality of labels; process the first one or more temporary extracted features to identify a first trend, the first trend indicating a first one or more of the plurality of labels; identify a label of the plurality of labels based on the first one or more of the plurality of labels; and generate a speculated classification result based on the label.

EXAMPLE 15

The non-transitory computer-readable storage medium of claim 14, comprising instructions that when executed by the circuitry of the IDS, cause the IDS to: identify a second one or more temporary extracted features; process the second one or more temporary extracted features to identify a second trend, the second trend indicating a second one or more of the plurality of labels; and identify the label of the plurality of labels based on the first one or more of the plurality of labels and the second one or more of the plurality of labels.

EXAMPLE 16

The non-transitory computer-readable storage medium of claim 15, comprising instructions that when executed by the circuitry of the IDS, cause the IDS to: sum, for each label of the plurality of labels, a number of times the label is included in the first one or more of the plurality of labels and the second one or more of the plurality of labels; and identify the label of the plurality of labels based on the sums.

EXAMPLE 17

The non-transitory computer-readable storage medium of claim 14, wherein a one of the plurality of labels correspond to a benign context.

EXAMPLE 18

The non-transitory computer-readable storage medium of claim 14, comprising instructions that when executed by the circuitry of the IDS, cause the IDS to: determine whether the label of the plurality of labels is the one of the plurality of labels corresponding to the benign context; and generate a checkpoint of a system based on a determination that the label of the plurality of labels is not the one of the plurality of labels corresponding to the benign context.

EXAMPLE 19

The non-transitory computer-readable storage medium of claim 14, wherein the IDS is arranged to couple to an in-vehicle network (IVN) coupled to a plurality of electronic control units (ECUs), the IVN arranged to facilitate communication of messages between the ECUs, the IDS further arranged to identify malicious ones of the messages.

EXAMPLE 20

A computing apparatus comprising: circuitry; and memory coupled to the circuitry, the memory storing instructions, which when executed by the circuitry cause the apparatus to: extract one or more features associated with an actor or action, the actor or action to be monitored by an intrusion detection system (IDS); process the one or more extracted features and a random forest model via the circuitry to identify a first committed node in the random forest model, the IDS to utilize the random forest model to identify malicious context associated with the actor or action based on a benign label of a plurality of labels of the random forest model; determine whether the benign label is reachable based on the first committed node; and identify the malicious context based on a determination that the benign label is not reachable.

EXAMPLE 21

The computing apparatus of claim 20, the memory storing instructions that when executed by the circuitry further cause the apparatus to: process the one or more extracted features and the random forest model via the circuitry to identify a second committed node in the random forest model; and determine whether the benign label is reachable based on the first committed node and the second committed node.

EXAMPLE 22

The computing apparatus of claim 21, the memory storing instructions that when executed by the circuitry further cause the apparatus to, comprising abort continued processing the one or more extracted features and the random forest model via the circuitry based on a determination that the benign label is not reachable.

EXAMPLE 23

The computing apparatus of claim 20, comprising: an in-vehicle network (IVN); a plurality of electronic control units (ECUs) coupled via the IVN; and the IDS, the IDS comprising the circuitry and the memory.

EXAMPLE 24

The computing apparatus of claim 23, wherein the one or more extracted features are associated with the ECUs.

EXAMPLE 25

The computing apparatus of claim 26, wherein the one or more extracted features are associated with messages transmitted on the IVN by one or more of the ECUs.

EXAMPLE 26

A method, comprising: extracting one or more features associated with an actor or action, the actor or action to be monitored by an intrusion detection system (IDS); processing the one or more extracted features and a random forest model via circuitry to identify a first committed node in the random forest model, the IDS to utilize the random forest model to identify malicious context associated with the actor or action based on a benign label of a plurality of labels of the random forest model; determining whether the benign label is reachable based on the first committed node; and identifying the malicious context based on a determination that the benign label is not reachable.

EXAMPLE 27

The method of claim 26, comprising: processing the one or more extracted features and the random forest model via the circuitry to identify a second committed node in the random forest model; and determining whether the benign label is reachable based on the first committed node and the second committed node.

EXAMPLE 28

The method of claim 26, comprising aborting continued processing the one or more extracted features and the random forest model via the circuitry based on a determination that the benign label is not reachable.

EXAMPLE 29

The method of claim 26, wherein the actors are a plurality of electronic control units (ECUs) coupled via an in-vehicle network (IVN).

EXAMPLE 30

The method of claim 29, wherein the one or more extracted features are associated with the ECUs.

EXAMPLE 31

The method of claim 29, wherein the one or more extracted features are associated with messages transmitted on the IVN by one or more of the ECUs.

EXAMPLE 32

An apparatus, comprising means arranged to implement the function of any one of claims 26 to 31.

EXAMPLE 33

At least one non-transitory computer-readable storage medium comprising instructions that when executed by circuitry of an intrusion detection system (IDS), cause the IDS to: extract one or more features associated with an actor or action, the actor or action to be monitored by the IDS; process the one or more extracted features and a random forest model via the circuitry to identify a first committed node in the random forest model, the IDS to utilize the random forest model to identify malicious context associated with the actor or action based on a benign label of a plurality of labels of the random forest model; determine whether the benign label is reachable based on the first committed node; and identify the malicious context based on a determination that the benign label is not reachable.

EXAMPLE 34

The non-transitory computer-readable storage medium of claim 33, comprising instructions that when executed by the circuitry of the IDS, cause the IDS to: process the one or more extracted features and the random forest model via the circuitry to identify a second committed node in the random forest model; and determine whether the benign label is reachable based on the first committed node and the second committed node.

EXAMPLE 35

The non-transitory computer-readable storage medium of claim 34, comprising instructions that when executed by the circuitry of the IDS, cause the IDS to abort continued processing the one or more extracted features and the random forest model via the circuitry based on a determination that the benign label is not reachable.

EXAMPLE 36

The non-transitory computer-readable storage medium of claim 34, wherein the IDS is arranged to couple to an in-vehicle network (IVN), the IVN coupled to a plurality of electronic control units (ECUs) and arranged to facilitate communication of messages by the ECUs.

EXAMPLE 37

The non-transitory computer-readable storage medium of claim 36, wherein the one or more extracted features are associated with the ECUs.

EXAMPLE 38

The non-transitory computer-readable storage medium of claim 36, wherein the one or more extracted features are associated with messages transmitted on the IVN by one or more of the ECUs.

What is claimed is:

1. A computing apparatus comprising:
   circuitry; and
   memory coupled to the circuitry, the memory storing instructions, which when executed by the circuitry cause the apparatus to:
      identify a first one or more temporary extracted features, the extracted features associated with inputs to a random forest model, the random forest model arranged to classify the extracted features into one of a plurality of labels;
      process, via the circuitry, the first one or more temporary extracted features to identify a first trend, the first trend indicating a first one or more of the plurality of labels;
      identify a label of the plurality of labels based on the first one or more of the plurality of labels; and
      generate a speculated classification result based on the label.

2. The computing apparatus of claim 1, the memory storing instructions that when executed by the circuitry further cause the apparatus to, comprising:
   identify a second one or more temporary extracted features;
   process, via the circuitry, the second one or more temporary extracted features to identify a second trend, the second trend indicating a second one or more of the plurality of labels; and
   identify the label of the plurality of labels based on the first one or more of the plurality of labels and the second one or more of the plurality of labels.

3. The computing apparatus of claim 2, the memory storing instructions that when executed by the circuitry further cause the apparatus to, comprising:
   sum, for each label of the plurality of labels, a number of times the label is included in the first one or more of the plurality of labels and the second one or more of the plurality of labels; and
   identify the label of the plurality of labels based on the sums.

4. The computing apparatus of claim 1, wherein a one of the plurality of labels correspond to a benign context.

5. The computing apparatus of claim 4, the memory storing instructions that when executed by the circuitry further cause the apparatus to, comprising:
   determine whether the label of the plurality of labels is the one of the plurality of labels corresponding to the benign context; and
   generate a checkpoint of a system based on a determination that the label of the plurality of labels is not the one of the plurality of labels corresponding to the benign context.

6. The computing apparatus of claim 1, comprising:
   an in-vehicle network (IVN);
   a plurality of electronic control units (ECUs) coupled via the IVN; and
   an intrusion detection system (IDS), the IDS comprising the circuitry and the memory.

7. A method, comprising:
   identifying a first one or more temporary extracted features, the extracted features associated with inputs to a random forest model, the random forest model arranged to classify the extracted features into one of a plurality of labels;
   processing, via circuitry, the first one or more temporary extracted features to identify a first trend, the first trend indicating a first one or more of the plurality of labels;
   identifying a label of the plurality of labels based on the first one or more of the plurality of labels; and
   generating a speculated classification result based on the label.

8. The method of claim 7, comprising:
   identifying a second one or more temporary extracted features;
   processing, via the circuitry, the second one or more temporary extracted features to identify a second trend, the second trend indicating a second one or more of the plurality of labels; and
   identifying the label of the plurality of labels based on the first one or more of the plurality of labels and the second one or more of the plurality of labels.

9. The method of claim 8, comprising:
   summing, for each label of the plurality of labels, a number of times the label is included in the first one or more of the plurality of labels and the second one or more of the plurality of labels; and
   identify the label of the plurality of labels based on the sums.

10. The method of claim 7, wherein a one of the plurality of labels correspond to a benign context.

11. The method of claim 10, comprising:
    determining whether the label of the plurality of labels is the one of the plurality of labels corresponding to the benign context; and
    generating a checkpoint of a system based on a determination that the label of the plurality of labels is not the one of the plurality of labels corresponding to the benign context.

12. At least one non-transitory computer-readable storage medium comprising instructions that when executed by circuitry of an intrusion detection system (IDS), cause the IDS to:
    identify a first one or more temporary extracted features, the extracted features associated with inputs to a random forest model, the random forest model arranged to classify the extracted features into one of a plurality of labels;
    process the first one or more temporary extracted features to identify a first trend, the first trend indicating a first one or more of the plurality of labels;
    identify a label of the plurality of labels based on the first one or more of the plurality of labels; and
    generate a speculated classification result based on the label.

13. The non-transitory computer-readable storage medium of claim 12, comprising instructions that when executed by the circuitry of the IDS, cause the IDS to:
    identify a second one or more temporary extracted features;
    process the second one or more temporary extracted features to identify a second trend, the second trend indicating a second one or more of the plurality of labels; and
    identify the label of the plurality of labels based on the first one or more of the plurality of labels and the second one or more of the plurality of labels.

14. The non-transitory computer-readable storage medium of claim 13, comprising instructions that when executed by the circuitry of the IDS, cause the IDS to:
    sum, for each label of the plurality of labels, a number of times the label is included in the first one or more of the plurality of labels and the second one or more of the plurality of labels; and identify the label of the plurality of labels based on the sums.

15. The non-transitory computer-readable storage medium of claim 12, wherein a one of the plurality of labels correspond to a benign context.

16. The non-transitory computer-readable storage medium of claim 12, comprising instructions that when executed by the circuitry of the IDS, cause the IDS to:
   determine whether the label of the plurality of labels is the one of the plurality of labels corresponding to the benign context; and
   generate a checkpoint of a system based on a determination that the label of the plurality of labels is not the one of the plurality of labels corresponding to the benign context.

17. The non-transitory computer-readable storage medium of claim 12, wherein the IDS is arranged to couple to an in-vehicle network (IVN) coupled to a plurality of electronic control units (ECUs), the IVN arranged to facilitate communication of messages between the ECUs, the IDS further arranged to identify malicious ones of the messages.

18. A system, comprising:
   an in-vehicle network (IVN);
   a plurality of electronic control units (ECUs) coupled via the IVN; and
   an intrusion detection sub-system, comprising:
      circuitry, and
      memory coupled to the circuitry, the memory storing instructions, which when executed by the circuitry cause the intrusion detection sub-system to:
         identify a first one or more temporary extracted features, the extracted features associated with inputs to a random forest model, the random forest model arranged to classify the extracted features into one of a plurality of labels,
         process, via the circuitry, the first one or more temporary extracted features to identify a first trend, the first trend indicating a first one or more of the plurality of labels,
         identify a label of the plurality of labels based on the first one or more of the plurality of labels, and
         generate a speculated classification result based on the label.

19. The system of claim 18, the memory storing instructions that when executed by the circuitry further cause the apparatus to, comprising:
   identify a second one or more temporary extracted features;
   process, via the circuitry, the second one or more temporary extracted features to identify a second trend, the second trend indicating a second one or more of the plurality of labels; and
   identify the label of the plurality of labels based on the first one or more of the plurality of labels and the second one or more of the plurality of labels.

20. The system of claim 19, the memory storing instructions that when executed by the circuitry further cause the apparatus to, comprising:
   sum, for each label of the plurality of labels, a number of times the label is included in the first one or more of the plurality of labels and the second one or more of the plurality of labels; and
   identify the label of the plurality of labels based on the sums.

\* \* \* \* \*